United States Patent
Shafi et al.

(10) Patent No.: US 11,994,609 B2
(45) Date of Patent: May 28, 2024

(54) METHOD AND APPARATUS FOR CODED RADAR SIGNALS

(71) Applicant: BDCM A2 LLC, Dover, DE (US)

(72) Inventors: Shoaib Shafi, El Dorado Hills, CA (US); Maha Achour, Encinitas, CA (US)

(73) Assignee: BDCM A2 LLC, Dover, DE (US)

( * ) Notice: Subject to any disclaimer, the term of this patent is extended or adjusted under 35 U.S.C. 154(b) by 48 days.

(21) Appl. No.: 16/687,550

(22) Filed: Nov. 18, 2019

(65) Prior Publication Data
US 2020/0158848 A1    May 21, 2020

Related U.S. Application Data

(60) Provisional application No. 62/768,621, filed on Nov. 16, 2018.

(51) Int. Cl.
| | |
|---|---|
| *G01S 13/32* | (2006.01) |
| *G01S 7/02* | (2006.01) |
| *G01S 13/34* | (2006.01) |
| *G01S 13/58* | (2006.01) |
| *G01S 13/931* | (2020.01) |

(52) U.S. Cl.
CPC .......... *G01S 7/023* (2013.01); *G01S 7/0234* (2021.05); *G01S 13/325* (2013.01); *G01S 13/34* (2013.01); *G01S 13/584* (2013.01); *G01S 13/931* (2013.01)

(58) Field of Classification Search
CPC ...... G01S 13/325; G01S 13/34; G01S 13/584; G01S 13/931
See application file for complete search history.

(56) References Cited

U.S. PATENT DOCUMENTS

| | | | |
|---|---|---|---|
| 6,127,899 A | * | 10/2000 | Silva ............ H03F 3/45385 331/172 |
| 6,492,949 B1 | | 12/2002 | Breglia et al. |
| 7,928,900 B2 | | 4/2011 | Fuller et al. |
| 9,236,892 B2 | | 1/2016 | Dupuy et al. |
| 9,545,923 B2 | | 1/2017 | Casse et al. |
| 10,205,457 B1 | | 2/2019 | Josefsberg et al. |

(Continued)

FOREIGN PATENT DOCUMENTS

| | | | |
|---|---|---|---|
| JP | 2004301649 A | * 10/2004 | |
| WO | 2016135694 A1 | 9/2016 | |
| WO | WO-2018199549 A1 | * 11/2018 | ......... H01Q 15/0086 |

OTHER PUBLICATIONS

R. Reuter, "77 GHz Radar Solutions," FTF-AUT-F0292, FTF, Freescale Technology Forum, Powering Innovation, 28 pages, Jun. 2011.

(Continued)

*Primary Examiner* — Timothy A Brainard
(74) *Attorney, Agent, or Firm* — Dinsmore & Shohl LLP (57) ABSTRACT

Examples disclosed herein relate to a system of object detection, the system including a continuous modulation signal unit to generate a continuous modulation signal, a code generation unit to sample, quantize and encode the continuous modulation signal to generate an encoded signal, a transmit antenna to transmit the encoded signal, and a receive antenna to receive a reflection of the encoded signal and separate the reflection of the encoded signal from other signals.

13 Claims, 8 Drawing Sheets

(56) References Cited

U.S. PATENT DOCUMENTS

| | | | |
|---|---|---|---|
| 2009/0289834 A1* | 11/2009 | Devensky | G01S 13/325 342/120 |
| 2012/0004802 A1* | 1/2012 | Horvitz | G06N 20/00 706/57 |
| 2013/0314268 A1* | 11/2013 | Fukuda | G01S 13/584 342/21 |
| 2014/0253368 A1* | 9/2014 | Holder | G01S 13/003 342/146 |
| 2014/0347234 A1 | 11/2014 | Caloz et al. | |
| 2016/0011307 A1 | 1/2016 | Casse et al. | |
| 2016/0061935 A1 | 3/2016 | McCloskey et al. | |
| 2016/0223644 A1* | 8/2016 | Soga | G01S 7/0234 |
| 2017/0350971 A1* | 12/2017 | Winstead | G01S 7/354 |
| 2019/0353770 A1* | 11/2019 | Schoor | G01S 13/583 |

OTHER PUBLICATIONS

Dr. S. Heuel, Automated Measurements of 77 GHz FMCW Radar Signals, Application Note, RoHDE & SCHWARZ, pp. 1-25.

L. Danielsson, "Tracking and Radar Sensor Modelling for Automotive Safety Systems," Thesis for the Degree of Doctor of Philosopie, Department of Signals and Systems, Signal Processing Group, Chalmers University of Technology, Göteborg, Sweden, pp. 1-102, 2010.

Moon-Sik Lee et al., System Modeling and Signal Processing for a Switch Antenna Array Radar, IEEE Transactions on Signal Processing, vol. 52, No. 6, pp. 1-11, Jun. 2004.

F. Bu, et al., "Pedestrian Detection in Transit Bus Application: Sensing Technologies and Safety Solutions," IEEE Proceedings, Intelligent Vehicles Symposium, Las Vegas, NV, pp. 100-105, Jun. 2005.

Modar Safir Shbat et al., "CFAR Detectors Employed by Radar Sensor Systems," 12th International Conference on Control, Automation and Systems, Jeju Island, Korea, pp. 1-5, Oct. 2012.

S. Patole, et al., "Automotive Radars: A Review of Signal Processing Techniques," Signal Processing for Smart Vehicle Technologies: Part 2, in IEEE Signal Processing Magazine, pp. 22-35, Mar. 2017.

S.-H. Jeong, et al., "A Multi-Beam and Multi-Range Radar With FMCW and Digital Beam Forming for Automotive Applications," Progress in Electromagnetics Research, vol. 124, pp. 285-299, 2012.

S. Carpenter, "Autonomous Vehicle Radar: Improving Radar Performance with Simulation," White Paper, High Frequency/Electronics Business Unit, ANSYS, Canonsburg, PA, pp. 1-14, 2017.

A. Babakhani et al., "Transmitter Architectures Based on Near-Field Direct Antenna Modulation," in IEEE Journal of Solid-State Circuits, vol. 43, No. 12, pp. 2674-2692, Dec. 2008.

S. Milch et al., "Pedestrian Detection with Radar and Computer Vision," Smart Microwave Sensors GmbH, Braunschweig, Germany, pp. 1-7, 2001.

Yahn Gürcan, "Super-resolution Algorithms for Joint Range-Azimuth-Doppler Estimation in Automotive Radars," Master of Sciences degree thesis, Delft University of Technology, pp. 1-72, Jan. 2017.

A. De Maio, "Cognitive Radar Signal Processing," 2014 Workshop on Mathematical Issues in Information Sciences, 51 pages, Jul. 2014.

J. Lin, et al., "Design of an FMCW Radar Baseband Signal Processing System for Automotive Application," Springer Plus, 5:42, pp. 4-16, Jan. 2016.

H. Rohling et al., "Waveform Design Principles for Automotive Radar Systems," Technical University of Hamburg-Harburg, Germany, Department of Telecommunications, pp. 1-4, Feb. 2001.

M. Steinhauer et al., "Millimeter-Wave-Radar Sensor Based on a Transceiver Array for Automotive Applications," IEEE Transactions on Microwave Theory and Techniques, vol. 56, No. 2, pp. 1-9, Feb. 2008.

Pavlo Molchanov, "Radar target classification by micro-Doppler contributions," Tampere University of Technology, pp. 1-208, 2014.

G. Reina, et al., "A Self-Learning Ground Classifier using Radar Features," Springer Tracts in Advanced Robotics, pp. 1-14, Dec. 2014.

"Implementing Digital Processing for Automotive Radar Using SoC FPGAs."White Paper, Altera Corporation, pp. 1-16, Dec. 2013.

* cited by examiner

METHOD AND APPARATUS FOR CODED RADAR SIGNALS

CROSS-REFERENCE TO RELATED APPLICATIONS

This application claims priority from U.S. Provisional Application No. 62/768,621, entitled "Method and Apparatus for Coded Radar Signals," filed on Nov. 16, 2018, and incorporated herein by reference in its entirety.

BACKGROUND

Autonomous vehicles and Automated Driver Assist Systems (ADASs) are the next phase of transportation around the world. While the main goal of such systems is to improve safety both for the individual and for the roadways and cities, these systems rely on accurate, reliable systems in a variety of situations, as well as the control decisions thereof.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout and wherein.

DETAILED DESCRIPTION

Methods and apparatuses to enable reliable, accurate and flexible object detection in a radar system with both line-of-sight (LOS) and non-line-of-sight (NLOS) detection capabilities are disclosed. In communications and object detection applications, a signal is transmitted to communicate information or identify a location of an object. The transmission path from a transmitter to a receiver in a communication system or from an object detection sensor to an object has a field of view within which the transmissions are uninterrupted. This field of view is referred to as a LOS. Within the LOS, transmission signals travel directly to a receiver or an object. For electromagnetic millimeter wavelength transmissions, an antenna transmits signals as a beamform that defines the LOS. In real world systems there are often obstacles that obstruct the direct transmission, such as buildings, trees, and so forth; these obstructions may act as reflection or deflection points that change the direction of all or some of the transmission signal. A reflection or deflection may also be referred to as an echo.

Note that throughout this description the term reflection is used to refer to the change in direction of energy transmitted from an antenna or transmission source, and includes both reflections and deflections. The energy is reflected or redirected on interaction with an obstacle. The processes and examples described herein relate to an object detection sensor employing a radar sensor; however, these processes, methods and apparatuses are applicable to other systems using transmissions for communication or object detection.

Figure 1:
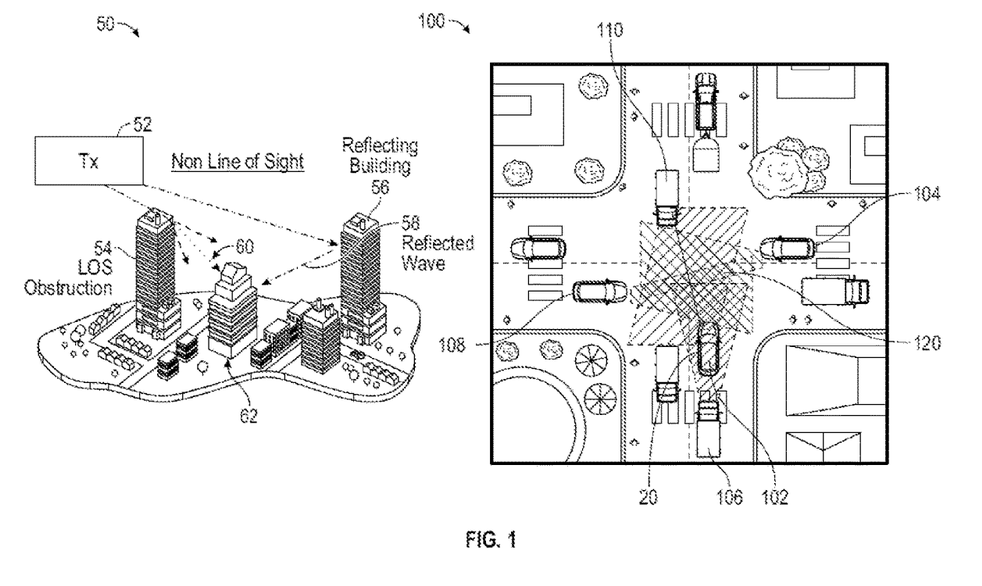
FIG. 1 illustrates a driving scenario with non-line of sight detection systems, according to various implementations of the subject technology.

FIG. 1 illustrates a communication system 50 having both LOS and NLOS transmission paths. A transmitter 52, which may be a transceiver, transmits signals in a first direction, wherein the signals interact with reflecting building 56 and the reflected waves 58 change direction and are received at building 62. Signals in a second direction have an obstruction within the LOS 54 which reflects waves 60 in multiple directions. In this system, there may be receivers located in NLOS areas as the LOS transmissions are obstructed by buildings.

FIG. 1 also illustrates an environment in which multiple vehicles are operating with object detection systems, such as for autonomous driving or for an automated driver assistance system (ADAS). The environment 100 is a transportation intersection with activity in all directions. Any sensor in a vehicle that is detecting objects is moving with the vehicle in a dynamic environment. Object detection in NLOS areas is thus a critical capability. Here NLOS refers to radio transmissions, such as radar transmissions, across a partially or fully, obstructed path; these obstructions are typically physical objects, such as a building.

An object detection system in a vehicle includes a sensor that moves with the vehicle, and therefore the sensor position and sensor field of view is in motion. Such sensors are tasked with understanding the environment within which it operates. There are a variety of sensors, and often a design incorporates multiple sensors, including camera, radar, lidar, ultrasound and others.

In object detection systems incorporating a radar modulation scheme, such as Frequency-Modulated Continuous Wave (FMCW), the difference between transmit and receive signals provides range information and velocity. The velocity is deduced from the phase difference between the transmit and receive signals. The distance to an object, or the range, and the velocity are collated as a range-Doppler information, or mapping, to interpret the environment. The use of FMCW has many advantages in range-Doppler (R-D) detection.

Similarly, there are many other modulation schemes that may provide information as to the location of an object, and these schemes may be combined and used together. Another method is Pulse Code Modulation (PCM). When an antenna provides multiple transmission signals and is able to receive multiple transmission signals, the difference between these signals provides information as to range, velocity, reflectivity, direct reflection/deflection and so forth. The implementations of the subject technology described herein are not limited to a specific modulation scheme.

The implementations of the subject technology may be applied in a transportation system, such as environment 100 of FIG. 1. There are multiple vehicles traveling within this transportation environment 100, wherein at least some of the vehicles have object detection radar systems. The system 100 is illustrated with vehicle 102 having an object detection radar system for both long-range and short-range detection. Other systems may incorporate any number of range detection level(s). The other vehicles have radar systems that are also illustrated, such as vehicles 104, 106, 108, 110. The radar beams from several vehicles are provided in shadow, such as beam 120 of vehicle 102. Vehicle Radar Sensing Unit (RSU) 20 is positioned on or within vehicle 102.

Figure 2:
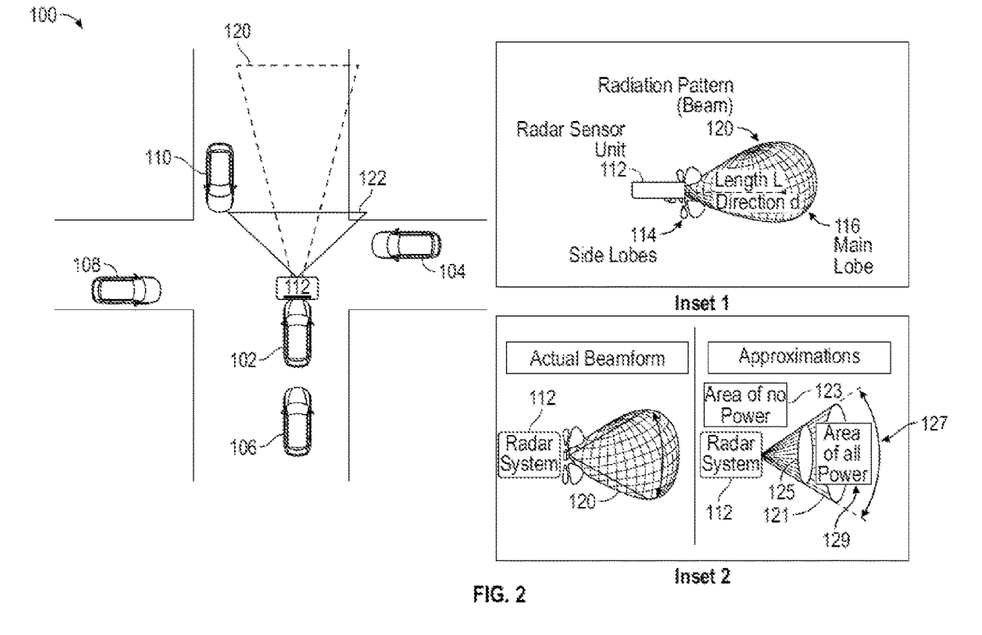
FIG. 2 illustrates operation of multiple radar detection systems, according to various implementations of the subject technology.

FIG. 2 also illustrates the environment 100 isolating vehicle 102 to illustrate the short-range radar beam 122 and the long-range radar beam 120. The position of vehicle 102 with respect to the other moving vehicles and with respect to the infrastructure is described. Objects, including other vehicles within the short and long-range beam areas are detectable within the area of beams 120, 122. This includes reflections and multi-path transmissions that pass through these areas. For simplicity, the areas are drawn as 2-D images, however, these beams are 3-D spatial images and they move as the RSU moves with a vehicle, and therefore, in that sense these beams are 4-D, including 3 dimensions and time. An inset image is also illustrated of radiation pattern, or beam, 120 having a directivity in a direction d, and a length L indicating the length to a 3 dB intensity point. The ratio of the radiation intensity in any direction d to the intensity averaged over all directions is the directive gain of the antenna in that direction. The directive gain along the direction in which that quantity is maximized is known as the directivity of the antenna, and the directivity multiplied by the radiation efficiency is the power gain of the antenna (very often just referred to as the gain, G). In the direction of maximum radiated power density, there is G times more power than we would have obtained from an isotropic antenna. Consider that antennas radiate the power that is supplied. The higher the gain G of a directional antenna, the more narrowly focused is the energy radiated from it.

In the implementations and examples provided herein, there is an assumption made that there exists a mathematical relationship between the gain of an antenna and the specific dimensions of the focused beam. This assumption results in an approximation that all radiated energy of an antenna is uniformly distributed across a beam with some solid angle $\Omega_{beam}$ and that no energy is radiated elsewhere. In this case, the directivity of the antenna must be equal to the ratio of the beam's solid angle, $\Omega_{beam}$, to the total area of the unit sphere ($4n$) and the solid angle, $\Omega_{beam}$, is inversely proportional to the directivity as illustrated in FIG. 2, insets. If the antenna has high directivity and radiates most of the received energy, then the gain and directivity are approximately the same and the size of the beam is inversely proportional to the gain. The beam angle is roughly the square root of the beam solid angle when the beam is reasonably symmetric. In most aspects the terms beam and beamform may be used interchangeably.

Continuing with FIG. 2, INSET 1 illustrates RSU 112 and a corresponding actual beamform, radiation pattern 120. The main lobe 116 is directed in direction d. There are also side lobes 114, which are designed to be minimized so as not to act as interference and object detection misdirects. INSET 2 illustrates an approximation of the actual beamform that enables calculations, simulations, analysis and design of an antenna in a radar system, such as RSU 112. The approximation replaces the radiation pattern 120, including both main lobe 116 and side lobes 114, as radiation pattern 121. In this approximation there is no power in area 123, and all of the power is present in the area 129 within the cone-shaped radiation pattern 121. The approximation is that all energy radiated by the antenna is uniformly distributed across beamform 121 in a cone form within the area of a solid angle $\Omega_{beam}$ 125 that is a measure of the field of view from the RSU 112. The beam 121 is approximated to be symmetric and therefore beam angle $\theta_{beam}$ 127 is then approximately equal to the square root of the beam solid angle 125. For clarity, these 3D features are described by slices of the radiation pattern beamform in planes that pass through symmetry axes of the beamform.

The RSU 112 of vehicle 102 may transmit radiation beamforms in a variety of directions. In some examples, the RSU 112 steers the beam, changing the directivity of the beamform. When a beam is directed toward an object or obstruction, there is a reflection or redirection of the energy of the beamform, sending energy in directions and areas that may be in NLOS areas.

Figure 3:
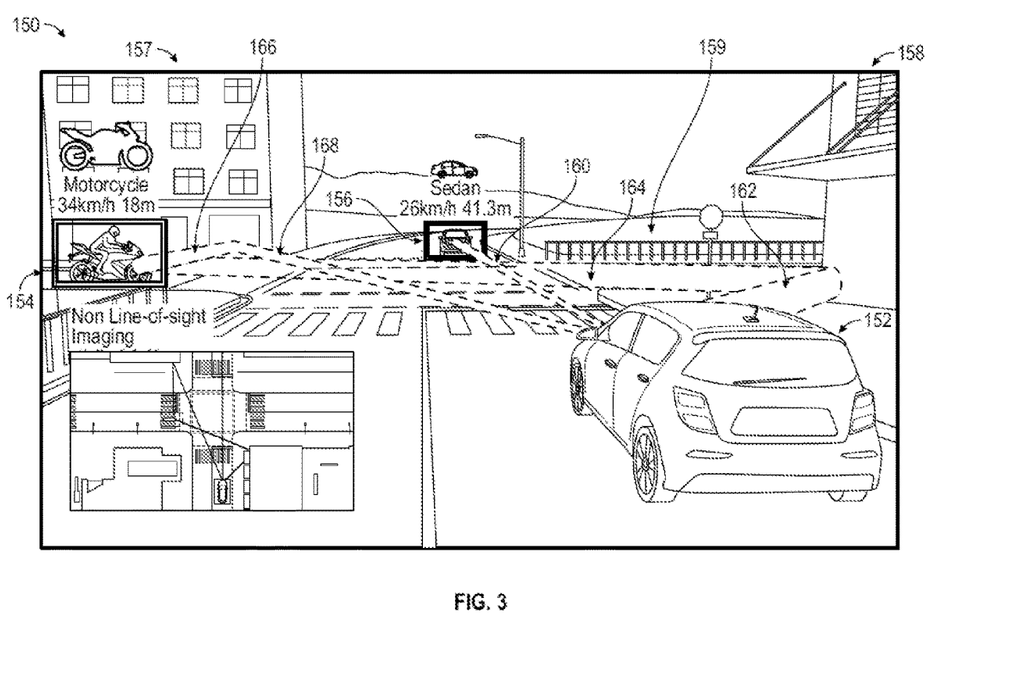
FIG. 3 illustrates a range of a vehicle radar unit, according to various implementations of the subject technology.

FIG. 3 illustrates a driving environment 150 having a vehicle 152 traveling forward through an intersection. On two corners are buildings 157, 158, close to the roadway and on another corner is a field 159. As the vehicle 152 drives through the environment, radar signals are sent and echoes are received. The vehicle 152 includes a radar unit, similar to RSU 112, having capability to generate and transmit a radar signal that enables the vehicle 152 to comprehend the environment, identify obstacles, make determinations of action(s) and so forth. As the vehicle 152 travels, there is a vehicle 156 detected in the LOS of the vehicle 152. The vehicle 156 is a sedan moving in the same direction as the vehicle 152; radar beam transmission 160 directed in that direction is reflected by the vehicle 156 and received at vehicle 152 enabling range and velocity information calculations for vehicle 156. In this scenario, the vehicle 156 is referred to as a target.

Continuing with FIG. 3, transmissions from vehicle 152 also reflect off obstructions toward NLOS areas. The transmissions travel to building 158 in transmission path 162 and transmission signals reflect off building 158 to a NLOS vehicle, motorcycle 154, via transmission path 164. The energy then continues with reflection of transmission path 166 to the building 157, returning to vehicle 152 via transmission path 168. The lower inset provides a clear top view of the transmission paths and reflections. In this way, objects in the NLOS areas may be detected by the RSU in vehicle 152, e.g., RSU 112.

In the examples provided herein, the transmission signals are illustrated as individual paths, however, it is understood that the transmission from vehicle 152 is a radiation beam that covers a detection area that includes the objects detected. Portions of the energy of the radiation beam reflect on interaction with an obstacle. The short-range detection area 160 in FIG. 3 indicates an area covered by both the transmission radiation beam and the area within which energy is detected. Reflection points within area 160 are indicated as points 162, 154, and 164. The LOS transmission path 160 is unobstructed to detect objects in that direction. The reflection point 162 redirects the transmission signal to the motorcycle 154 from which the signal reflects back within the short-range detection area 160. The RSU 112 detects the signal, determines that it is a response to a transmission signal from vehicle 152 and then calculates range and velocity of the object. Similarly, a transmission reflecting from point 166 is directed to the motorcycle 154 and back to the short-range detection area 160 of vehicle 152. In this example, reflection points 162, 166 are stationary buildings and have a zero velocity, while the motorcycle 154 may be in motion or may be stopped.

Figure 4:
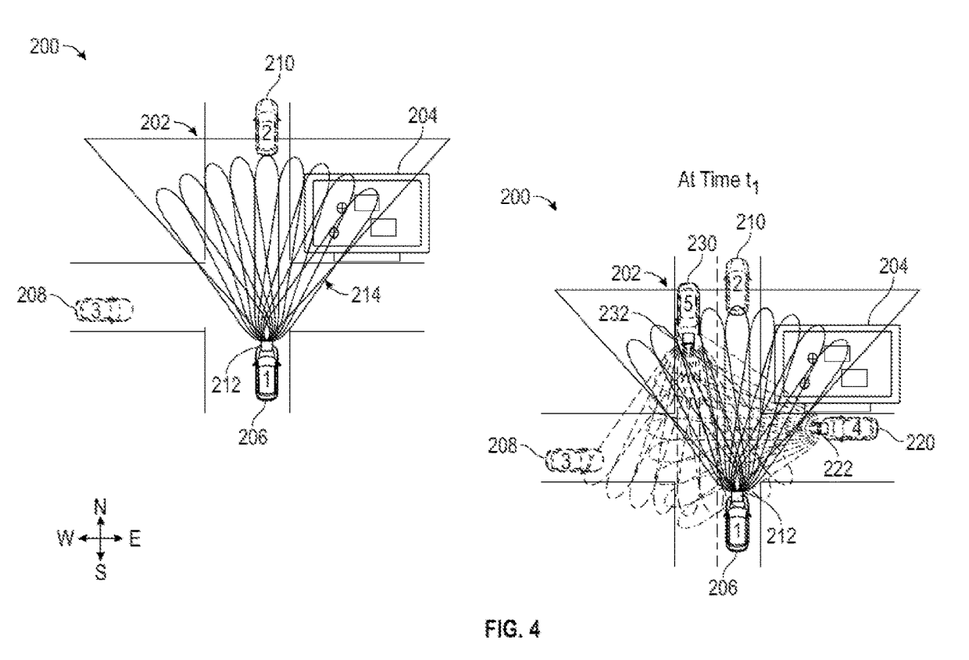
FIG. 4 illustrates multiple steered transmission beam angles in a radar detection system, according to various implementations of the subject technology.

The RSU signals of the present examples incorporate a steerable beam, as illustrated in FIG. 4, where the RSU 212 is illustrated with some of the generated beams. The possible angular range of the beamforms is twice the long-range angle (LRA). These are illustrated in time lapse format, where the beam is transmitted at distinct times in different directions so as to cover the short-range area over a time. The environment 200 has vehicle 1 with a radar sensing unit, RSU, that steers the transmission beam to cover a short-range area by beams 202. The radar beams 202 interact with office building 204, which reflects the transmission beams directed toward it. The various interactions are illustrated as transmission paths 214 where the multiple beam directions each result in different reflections. Where the surface is uneven or irregular, there may also be scattering. The target vehicle 208 is in the NLOS of the radar unit. Some of the transmission paths result in detection of the target, and others go in different directions until there is no energy left. These reflections may be used to identify objects in a NLOS area. The beams generated at the end of the LRA are illustrated.

The actual size of a radiation beam may be fine, referred to as a pencil beam, and may be adjusted by a radar controller in response to road conditions, objects detected, and operation of the vehicle. In environment 200, a vehicle 206 is moving in a North direction, as is vehicle 210. Vehicle 208 is moving East. The vehicle 206 has RSU 212 that is transmitting beams over a short-range area 202. The individual beams 214 are used to scan the short-range area 202 for objects, including vehicles and buildings, such as building 204. There may be any number of reflection points where these interactions with objects cause abrupt discontinuations in the radiation pattern and transmission.

Figure 5:
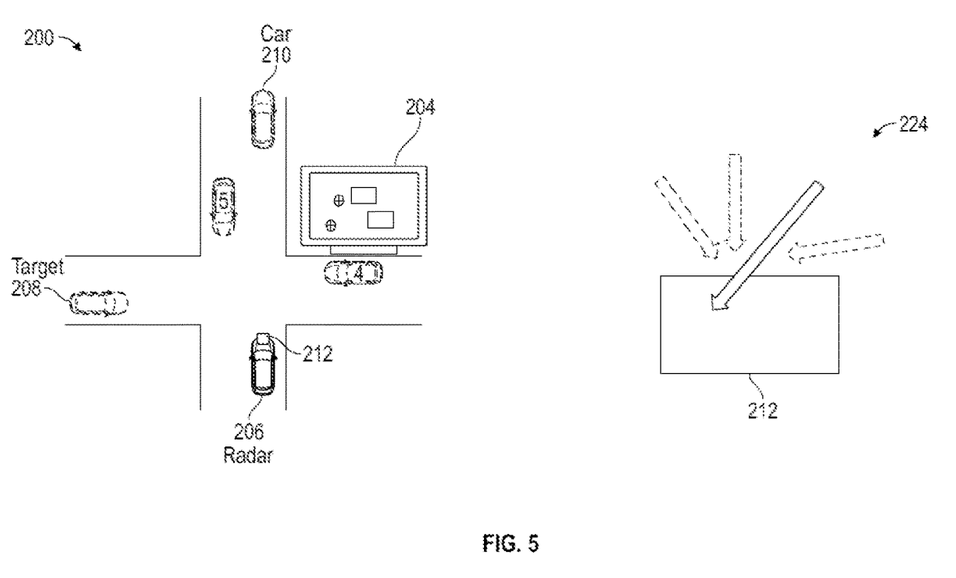
FIG. 5 illustrates operation of an object detection system, according to various implementations of the subject technology.

In some implementations, the transmissions from RSU 212 are provided in FMCW modulation enabling detection of objects location and movement. This information is in the form of range and velocity coordinated data, referred to as Range-Doppler Maps. This is discussed hereinbelow in more detail. FIG. 5 illustrates some of the paths taken by the various signals such that RSU 212 receives signals 224 from car 210, vehicle 5, vehicle 4 and target 208, which may involve reflections, deflections and hops of the signals. The RSU 212 is tasked with identifying the signals transmitted from vehicle 206 and separating these signals from those of other vehicles and paths. This is done by encoding the signal transmissions from RSU 212 for identification on return.

Figure 6:
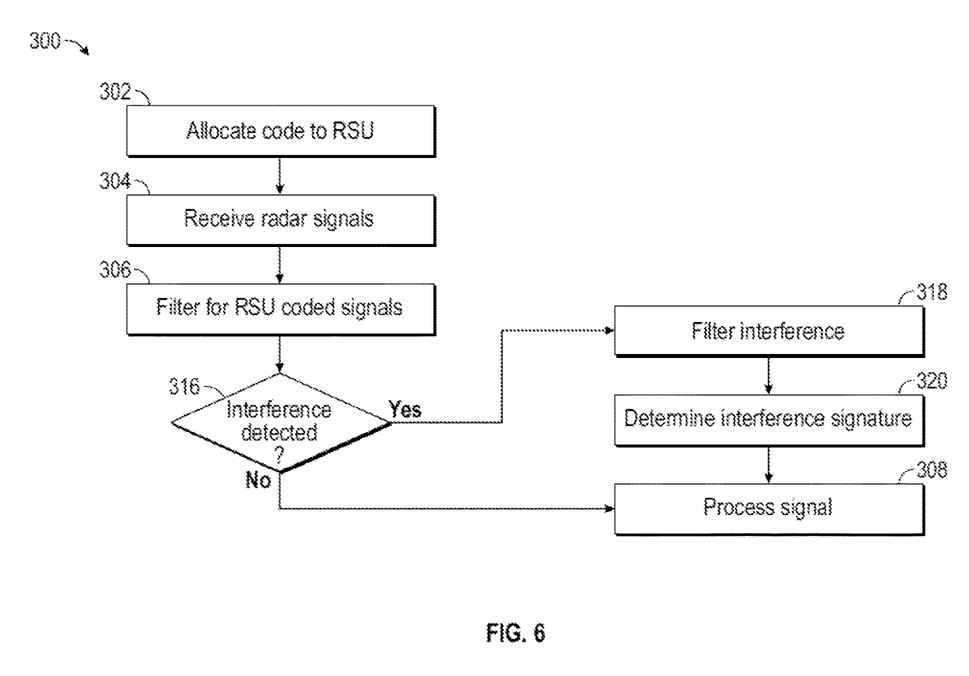
FIG. 6 illustrates a process for operation of a coded radar system, according to various implementations of the subject technology.

FIG. 6 illustrates a flow chart for operation 300 of a system for object detection, where processing allocates a specific code for identification of the vehicle and used in the RSU, 302. The system receives radar signals, 304, and filters for the vehicles RSU coded signals, 306. The coding may be implemented by a pulse code modulation (PCM) or other coding scheme. The system then determines if there is interference detected, 316, and if not, continues to process the signal, 308. If there is interference, then the system filters the interference, 318, and determines an interference signal, 320, wherein the interference signal identifies a signal condition of the environment of the vehicle.

Figure 7:
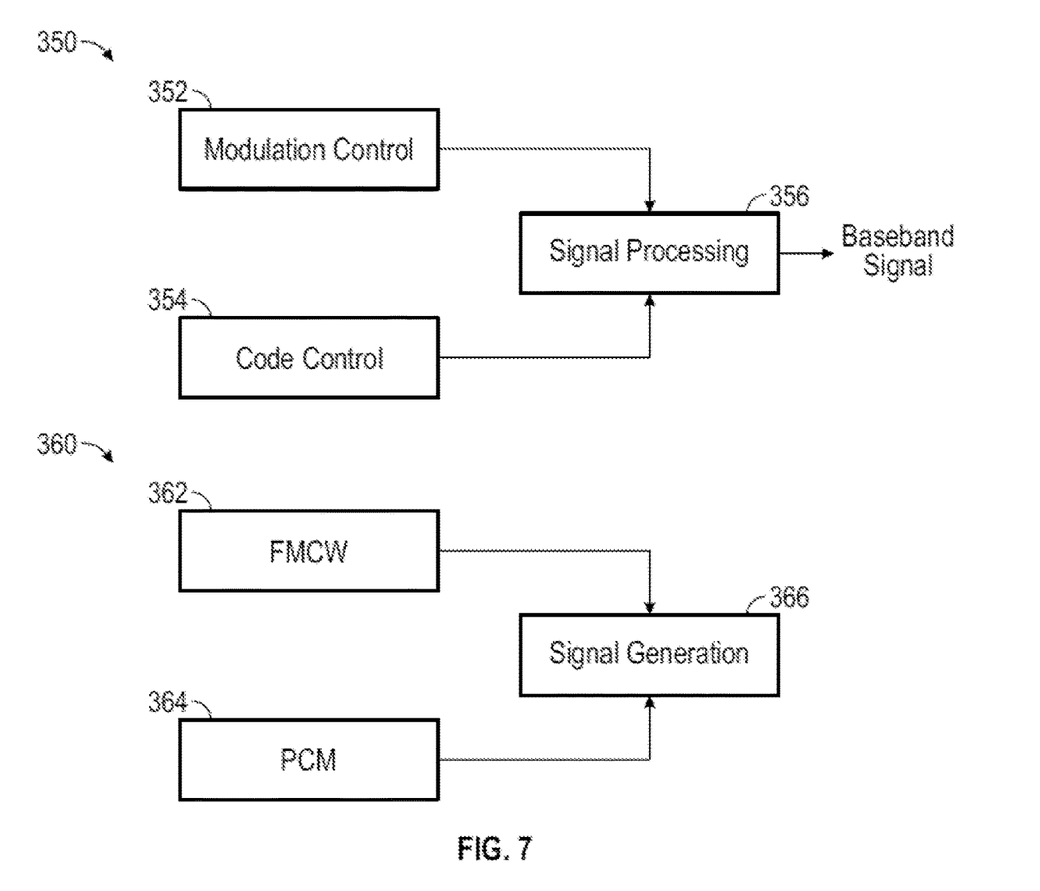
FIG. 7 illustrates modules in coded radar systems, according to various implementations of the subject technology.

FIG. 7 illustrates signal generation for operation within a noisy environment. There may be any number of reflections and deflections (hops) within a given scenario. In a scenario as illustrated in FIG. 4, there are several vehicles with radar signals in process, including vehicle 220 with RSU 222, vehicle 206 having RSU 212, and vehicle 230 having RSU 232, for example. The transmissions form a cloud of signals that cause interference with each other. In the present examples, RSU 212 has a MIMO configuration with multiple transmit antennas and multiple receive antennas, where each signal transmitted has multiple transmissions. Each transmission is coded so as to be differentiable from the other transmission signals. The coding may be an orthogonal coding, such as a Kasami coding system, operating in a pulse code modulation (PCM) scheme. To understand the environment, RSU 212 must be able to distinguish its own transmission signals from those of other vehicles (noise) and also distinguish between the coded transmissions from its antennas. To enable the identification of a specific vehicle, the system incorporates a coding mechanism into a range detection mechanism, resulting in a coded FMCW mechanism.

As illustrated in FIG. 7, the system 350 has a modulation control module 352 and a code control module 354, both of which feed the signal processing unit 356 to generate the baseband signal. In this way, the code control module 354 generates a pulse code modulation-type signal to identify the vehicle, while the modulation control provides signals in a form allowing derivation of range and velocity. The system 360 includes a specific FMCW module 262 and a PCM module 364 to generate signals from signal generation unit 366. In these systems, the radar signal is a continuous wave signal, and the code control quantizes the continuous wave signal, resulting in a coded FMCW modulation mechanism. The coded portion enables detection of a specific vehicle or transmission from a vehicle, while the continuous signal provides object detection parameters. As in systems 350-360, the code control modules 354-364 each provide both quantization of the coded signal as well as encoding for the transmitter. This enables the dual function of target detection and identification of a signal among a crowded electromagnetic signal area.

Continuing with the scenarios of FIG. 4, in some examples, an RSU 212 transmits and receives MIMO signals, wherein antennas may be dedicated to a receive chain and other antennas may be dedicated to a transmit chain providing spatial differentiation. In some examples, a single set of antennas is used for both transmit and receive and the antennas where transmission are time differentiated. The RSU 212 transmits signals from multiple antennas having coded signals identifying RSU 212. The signals may have direct LOS object deflections or may have multi-hop deflections between transmit and receive. The receive antennas of RSU 212 receive signals and compare them to a power threshold to determine which signals are direct reflections and which may need further processing. The low power signals are then determined to be NLOS and/or multi-hop signals as the signals traveled farther requiring energy. To identify objects, these signals are compared to a reduced power threshold. For example, a transmission 214 may deflect off building 204 to target 208 and back to RSU 212. In practical terms, the signal hits an object, such as a building, person, car and so forth, and the energy of the originally transmitted pulse is scattered in multiple directions. A portion of the reflection, or deflected signal returns to the receiver. When there are multiple hops, the transmit signal hits a first object, energy scatters and hits another object, from which energy scatters and some returns to the RSU 212. As the signal scatters, it loses energy. Identification of these low energy signals considers noise and other RF signals that may interfere with the low energy, low power, signals. The present implementations compare these low power signals to a reduced power threshold and then separates them from noise by coding, such as Kasami coding, Walsh coding, and so forth. The process may need to reduce the power threshold multiple times and may even reduce to a minimum value without capturing sufficient energy to identify an object. When the object is detected and decoded, the information provides range and velocity information to create R-D mapping information. This information is used to control operation of the vehicle and/or provide an indicator to a vehicle operator.

Figure 8:
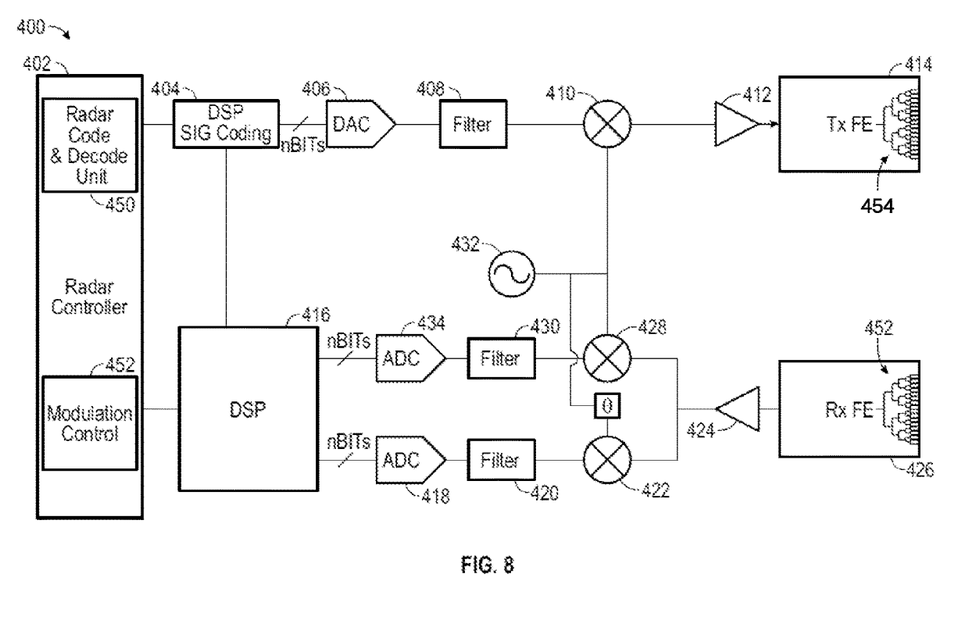
FIG. 8 illustrates a coded radar system, according to various implementations of the subject technology.

Attention is now directed to FIG. 8, which illustrates RSU 400 having transmit and receive antennas, sometimes referred to as a monostatic radar unit. Other units may implement systems that use a single antenna or set of antennas for both transmit and receive. The RSU 400 operates to detect range to an object from a pulse delay, velocity of an object from the Doppler frequency shift, as well as angular direction of transmission and arrival of radar and echo, respectively. Each object has a cross-sectional signature determined by the target size, shape, components, movement, material composition, and so forth. Radar controller 402 supervises operation of RSU 400, including generating the digital signal processing (DSP) signal coding for transmission from DSP unit 404, which is provided to a digital-to-analog converter 406 for transmission from antenna unit 414. The DSP unit 404 provides a number, n, of bits of digital data (nbits) to DAC 406, which converts the digital signal to an analog signal. The analog signal is then put through filter 408 and the filtered signal is coupled to mixer 410 to be modulated on a carrier signal provided by signal generator 432. In various implementations, the signal generator 432 provides a pulse modulation scheme, but alternate implementations may use other modulation schemes that also enable range-Doppler detection and NLOS detection. The modulated signal is then put into power amplifier 412 for transmission as radiation beams over the air from antenna unit 414.

As illustrated, the transmit antenna unit 414 includes a power distribution network 454 to a radiating structure or antenna. In various examples, the antenna unit 414 can be manufactured from metastructures, which are specially designed structures that manipulate electromagnetic signals to suite various applications. More specifically, metastructures are engineered, non- or semi-periodic structures that are spatially distributed to meet a specific phase and frequency distribution. A metastructure antenna can be designed with metastructure reflector elements that are very small relative to the wavelength of the RF signals.

Continuing with RSU 400, mixer 410 is coupled to mixer 428 in the receive chain, which includes receive antenna unit 426 having power distribution and antenna network 452. Received signals are provided to a low noise amplifier (LNA) that is coupled to mixers 428, 422. The paths are then filtered and converted back to digital signals having n bits each, which are then provided to DSP 416.

The radar controller 402 includes an Rx power threshold control unit 450 to set the power threshold for comparison of Rx signals, including to reduce the power threshold for detection of NLOS objects. The radar controller 402 also includes a modulation controller 452 to generate and control coding of the transmission signals, such as to implement Kasami coding. This coding enables an object detection unit (not shown) in the RSU 400 to identify its transmissions from those of other RF sources.

The radar systems presented herein may implement the various aspects, configurations, processes and modules described throughout this description. The radar system may be configured for placement in an autonomous driving system or in another structure in an environment (e.g., buildings, bill boards along roads, road signs, traffic lights, etc.) to complement and supplement information of individual vehicles, devices and so forth. The radar system scans the environment, and may incorporate infrastructure information and data, to alert drivers and vehicles as to conditions in their path or surrounding environment. The radar system is also able to identify targets and actions within the environment. The various examples described herein support autonomous driving with improved sensor performance, all-weather/all-condition detection, advanced decision-making algorithms and interaction with other sensors through sensor fusion. The radar system leverages intelligent metastructures and AI techniques to create a truly intelligent digital eye for autonomous vehicles. By incorporating features of a communication system into an object detection system, the operation of a radar system is greatly expanded and enables effective filtering of noise and interference.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A method for signal generation, comprising:
   generating a continuous waveform signal;
   encoding the continuous waveform signal as a first signal, wherein the encoding comprises applying a Kasami coding to generate the first signal separable from noise and interfering signals based on the Kasami coding in the first signal, wherein the encoding further comprises generating, via a code control module, a pulse code modulation-type signal in the first signal that enables an identification of a detected object, and wherein the encoding further comprises generating, via a modulation control module, a quantization of the first signal in a form that enables a derivation of a range and velocity of the detected object;
   transmitting the first signal from a first transmitter through multiple transmissions in a beam-steering scheme, wherein each transmission of the multiple transmissions is coded differently from other transmissions of the multiple transmissions;
   receiving a plurality of signals from a plurality of sources;
   isolating a reflection of the first signal from the plurality of signals;
   determining a range and a velocity of an object detected by the reflection of the first signal;
   comparing received signals to a power threshold to identify direct reflection signals and low power signals; and
   comparing low power signals to a reduced power threshold to separate the low power signals from noise signals.

2. The method of claim 1, wherein the continuous waveform signal is a frequency modulation continuous wave signal.

3. The method of claim 1, wherein the encoding of the continuous waveform signal as the first signal comprises applying pulse code modulation to generate the first signal.

4. The method of claim 1, wherein the reflection of the first signal comprises a non-line-of-sight (NLOS) deflection or a multi-hop deflection.

5. The method of claim 1, wherein the isolating of the reflection of the first signal from the plurality of signals comprises decoding the reflection of the first signal.

6. The method of claim 1, wherein the isolating of the reflection of the first signal from the plurality of signals further comprises comparing the reflection of the first signal to the power threshold.

7. The method of claim 6, wherein the isolating of the reflection of the first signal from the plurality of signals further comprises reducing the power threshold for detection of non-line-of-sight (NLOS) objects.

8. The method of claim 1, wherein the transmitting of the first signal from the first transmitter comprises transmitting the first signal using a metastructure antenna.

9. A method for object detection, comprising:
   allocating a code to a radar sensing unit in a vehicle;
   encoding a continuous modulation signal with the code, thereby generating a coded signal, wherein the encoding comprises generating, via a code control module, a pulse code modulation-type signal in the coded signal that enables an identification of a detected object, and wherein the encoding further comprises generating, via a modulation control module, a quantization of the coded signal in a form that enables a derivation of a range and velocity of the detected object;
   transmitting the coded signal in multiple transmissions during a beam-steering operation of the radar sensing unit, wherein each transmission of the multiple transmissions is coded differently from other transmissions of the multiple transmissions;
   receiving a plurality of reflections from a plurality of sources;
   filtering the plurality of reflections to isolate the coded signal, wherein the coded signal is encoded with Kasami coding and separable from noise and interfering signals based on the Kasami coding in the coded signal;
   detecting an interference signature;
   comparing received signals to a power threshold to identify direct reflection signals and low power signals; and
   comparing low power signals to a reduced power threshold to separate the low power signals from noise signals.

10. The method of claim 9, wherein the transmitting of the coded signal is through a metastructure antenna in the radar sensing unit.

11. The method of claim 9, wherein the filtering of the plurality of reflections to isolate the coded signal comprises comparing the plurality of reflections to the power threshold.

12. The method of claim 11, wherein the filtering of the plurality of reflections to isolate the coded signal further comprises reducing the power threshold for detection of non-line-of-sight (NLOS) objects.

13. The method of claim 9, wherein the detecting of the interference signature with the radar sensing unit comprises identifying a signal condition of an environment of the vehicle.

* * * * *